INVENTORS
FREDERICK R. FLUHR
DONALD J. McLAUGHLIN

BY
ATTORNEY

United States Patent Office 3,522,603
Patented Aug. 4, 1970

3,522,603
IFF CONFIDENCE EVALUATION CIRCUIT
Frederick R. Fluhr and Donald J. McLaughlin, Washington, D.C., assignors to the United States of America as represented by the Secretary of the Navy
Filed Apr. 14, 1969, Ser. No. 815,730
Int. Cl. G01s 9/56
U.S. Cl. 343—6.5     5 Claims

ABSTRACT OF THE DISCLOSURE

The invention consists of circuitry which utilizes the redundant returns of an IFF system to obtain an indication of the probability of a correct code readout. A first section weighs and integrates the values at each bit position while a second section estimates the confidence of the overall readout by analyzing the individual integrated values at each bit position.

STATEMENT OF GOVERNMENT INTEREST

The invention described herein may be manufactured and used by or for the Government of the United States of America for governmental purposes without the payment of any royalities thereon or therefor.

BACKGROUND OF THE INVENTION

The invention relates generally to IFF systems. More specifically the invention concerns a method of automatically obtaining a confidence indication of the binary code being read out.

In IFF systems the probability of reading out a correct code can vary significantly. In so far as the identification may be a part of an air defense system or civilian aircraft identification system, it is important that the operator have information as to the confidence of the code being read out. Several prior art attempts have been made to solve this problem utilizing the redundant returns from an IFF (Identification Friend or Foe) system. Typical of such systems is one which reads out a code only when a correct response is given on a certain percentage of the interrogations. For example if a correct code is returned in 3 out of 5 interrogations, the read-out will be considered correct. A varition of this technique is to allow readout when two or more successive identical codes are received. These techniques involve complex electronic circuitry and do not make maximum use of the redundant return characteristics of IFF systems.

OBJECTS OF THE INVENTION

It is therefore an object of the invention to provide in an IFF system circuitry which will provide the operator with a confidence indication of the code being read out.

It is a further object to provide a system which utilizes more fully the redundant return characteristic of IFF systems.

Still another object is to evaluate the confindence of each bit of the code on the basis of its weighted value over a preselected period and utilize this information in obtaining the overall confidence of the readout.

Still another object is to accomplish the above by means of comparatively simple and reliable circuitry.

SUMMARY OF THE INVENTION

These and other objects are achieved in the invention by analyzing repeated IFF returns and storing up a weighted value of the code at each code bit position. At the end of the reckoning period the most probable value of the code at each position is assessed, transferred to a register and decoded for numerical readout. Upon readout an indication of the confidence of the readout is assessed and indicated to the operator.

BRIEF DESCRIPTION OF THE DRAWINGS

The invention will be explained with reference to the drawings in which.

Referring now to FIG. 1 it is seen that radar and IFF–SIF return signals are constantly being fed into the video separator 7. At this point the SIF (Selective Identification Feature) signal which is that portion of the IFF return containing the coded identification reply from an aircraft, is separated from the radar information and fed to a delay line buffer 27, the remainder of the input signal being applied to the p.p.i. control circuits 8 for display. The p.p.i. operator desiring to identify a particular target displayed on the p.p.i. enables the system by activating the enabling circuits 13. This action enables the pulse gate 22 and aiming light circuitry 21 which is coupled to the light pencil 14. The light pencil 14 consists of two separated fiber optic bundles in coaxial arrangement. A first outer annular shaped bundle allows a light to be directed onto the p.p.i. so as to select target video for identification. The inner bundle transmits the light flashes from the selected target video to the detection and processing circuits to gate in the SIF code corresponding to the selected target. Thus the light pencil allows the operator to pin point a target which he wishes to identify. The enabling action also clears the buffer-register 16 and turns off the numerical readout lamps 18 which are activated by the light control 19. SIF information is always present in the delay line 28. The SIF code consists of a series of one-zero conditions and the exact number of bit positions in the code can vary according to the particular system and the volume of information to be contained therein. When the operator places the light detector portion of the light pencil over the target to be identified the light flashes from the p.p.i. are detected and converted to electrical pulses which pass through light pulse gate 22. The first pulse sets the bracket gate control 25 and triggers both the range gate multivibrator 24 and the azimuth gate multivibrator 23. The presence of an SIF code in the delay line is detected by means of a coincidence circuit 29. The SIF code is bracketed between two pulses identified in the art as start (ST) and stop (SP) pulses. When a code response is present in the delay line, coincidence circuit 29 generates an information transfer pulse which will be passed through transfer gate 26 when it has been enabled by gate control 25. The information transfer pulse allows the SIF code to be transfered from the buffer stages 30 to the weighted confidence stages 10. A more complete description of the circuits 10 will be given below. The information transfer pulse also triggers a video multivibrator 31 which causes an identifying mark to be painted on the p.p.i. pinpointing the target whose code is being read. The information transfer pulse also resets the bracket gate control 25, thus closing the transfer gate. The SIF code will be transferred from the buffer stages 30 to the confidence stage 10 only during the simultaneous presence of a signal from the azimuth gate multivibrator 23. The time duration of this signal is selected to allow for several redundant SIF returns from a selected target to be monitored. Each succeeding light pulse triggers the range gate multivibrator 24, but as previously noted the azimuth multivibrator 23 has a period sufficiently long to bracket the number of p.p.i. sweeps desired. The trailing edge of the azimuth gate multivibrator is used to turn off the aiming light in the light pencil and to enable the numerical readout lamps 18 by means of the light control 19. In addition it initiates the transfer of the weighted SIF code from the confidence stages 10 to the buffer register stages 16. The binary to octal converter 17 derives the octal code from the SIF code and turns on the proper numerical readout lamps. A confidence indication is obtained from the weighted confidence stages. A more complete explanation of this operation will be given below. The range gate multivibrator 24 resets the bracket gate control 25 in case no bracket pulse is present.

FIG. 2 shows in block form the operation of one of the weighted confidence stages illustrated at 10 of FIG. 1. It is to be understood that each bit position of the SIF code will have similar circuitry associated with it. As noted previously in FIG. 1 the SIF code is gated into the confidence stages 10 by the information transfer pulse originating in coincidence circuit 29. Thus the SIF bit information present in the buffer stages 30 of FIG. 1 will be fed into flip flop 35 by means of gate 33. The information transfer pulse also activates a one shot multivibrator 34 which produces a pulse of a preselected duration. The output from multivibrator 34, since it enables gate 37, will control the time over which the SIF bit is integrated and in addition will operate to reset flip flop 35 with its trailing edge. Flip flop 35 operates as a selector to switch either a "1" or "0" D.C. potential into the integrator 38 in response to the value of the SIF bit. Thus if the SIF bit is a "1" flip flop 35 is set and thereby operates to couple D.C. "1" reference into the integrator. A "0" bit value would similarly cause the "0" D.C. reference potential to be coupled into gate 37. As previously noted the time over which each reference potential is integrated is controlled by the output of multivibrator 34 which enables gate 37. Azimuth gate 23 of FIG. 1 is coupled to the weighted integrator 38 to control the time during which each target is monitored. The output of the weighted integrator is fed to a threshold circuit 40 which operates to enable a readout light if it is of a sufficient preselected magnitude. In addition circuit 38 is coupled to a confidence readout circuit 11 which will be more fully explained below.

In summary each bit of several SIF code returns from a selected target is used to gate in a corresponding reference voltage which is integrated. If a certain bit position contains all "1's" its integrated value will be high and therefore a readout lamp will be lit. However if less "1's" are present the integrated value will not be sufficient to enable a readout light, thus indicating a "0" value. It is obvious that the threshold circuits 40 can be constructed to operate the readout light at a variety of selected voltage levels. Thus the invention allows for a design choice as to what percentage of "1's" are required before a "1" readout light is activated.

Figure 1:
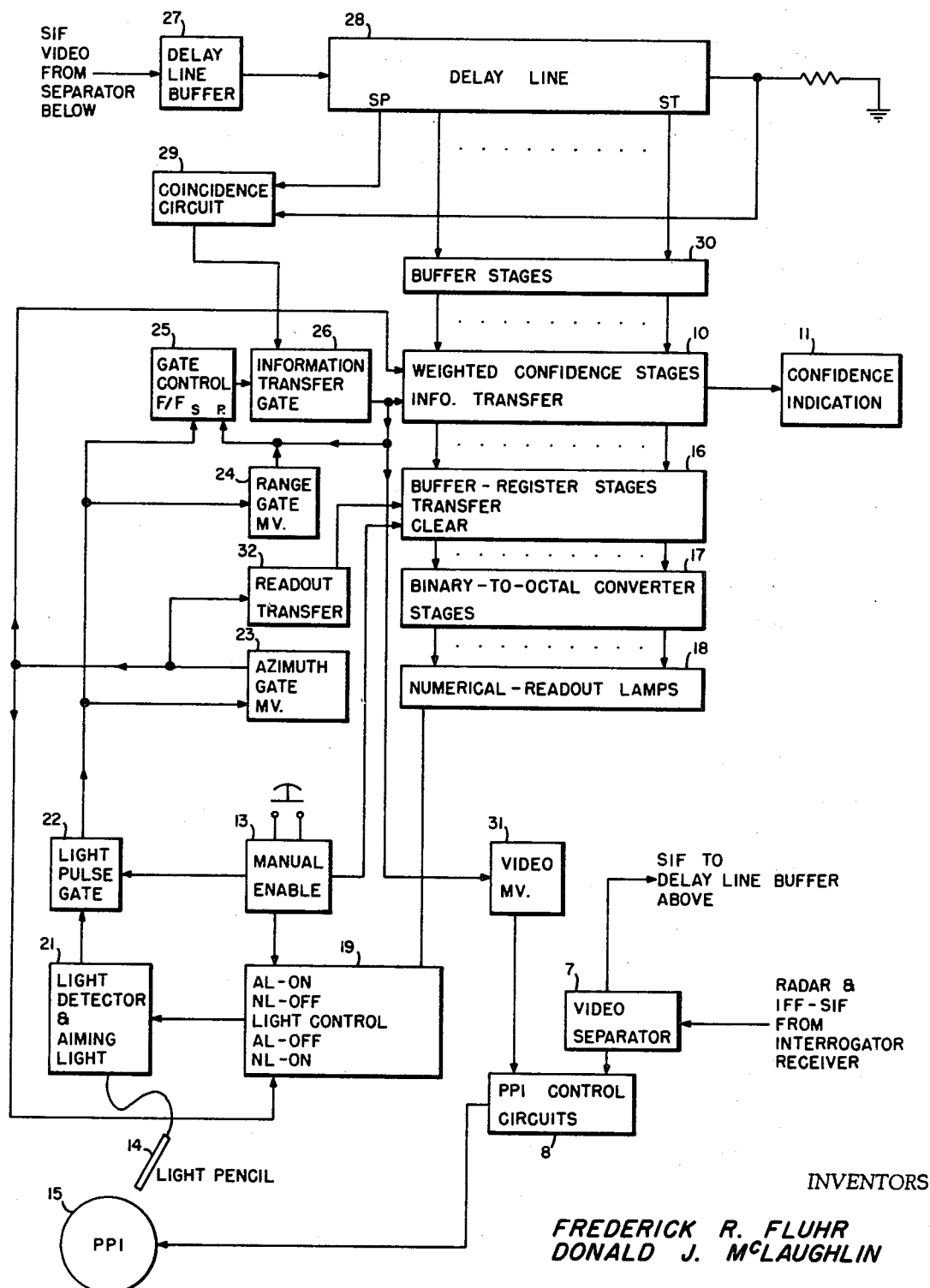
FIG. 1 is a block diagram of the overall system.
Figure 2:
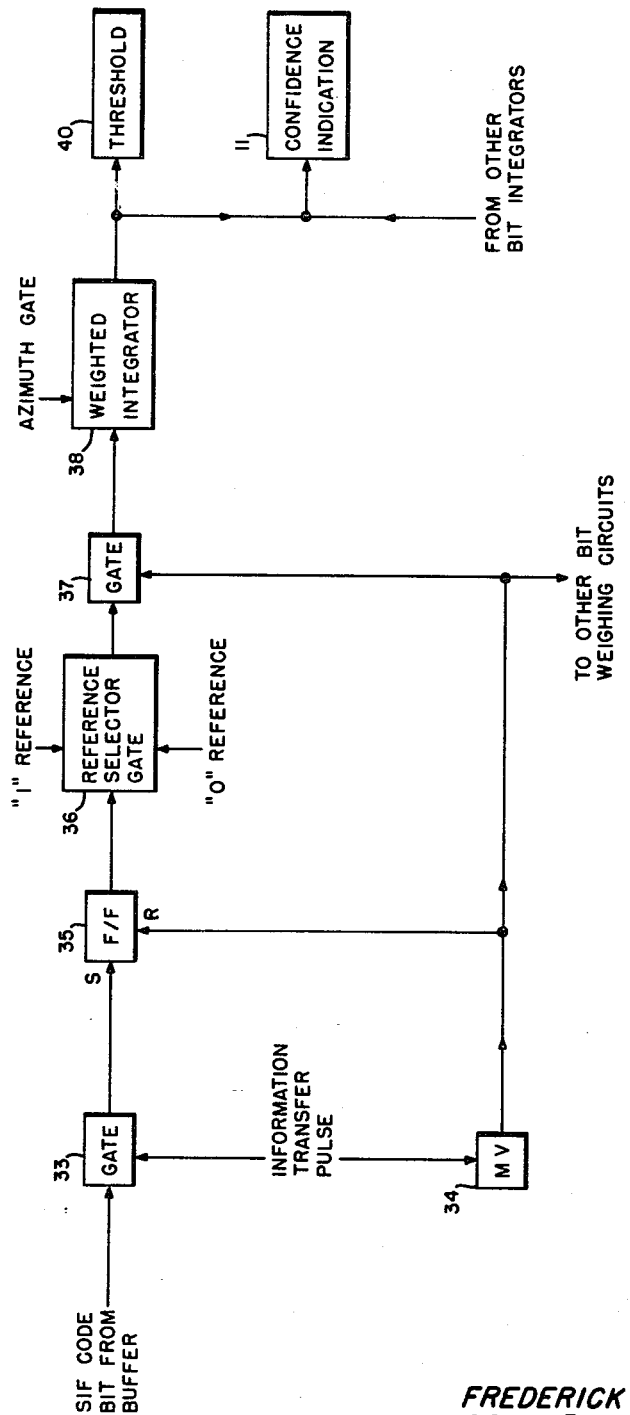
FIG. 2 is a block diagram of one of the weighted confidence stages of the invention.
Figure 3:
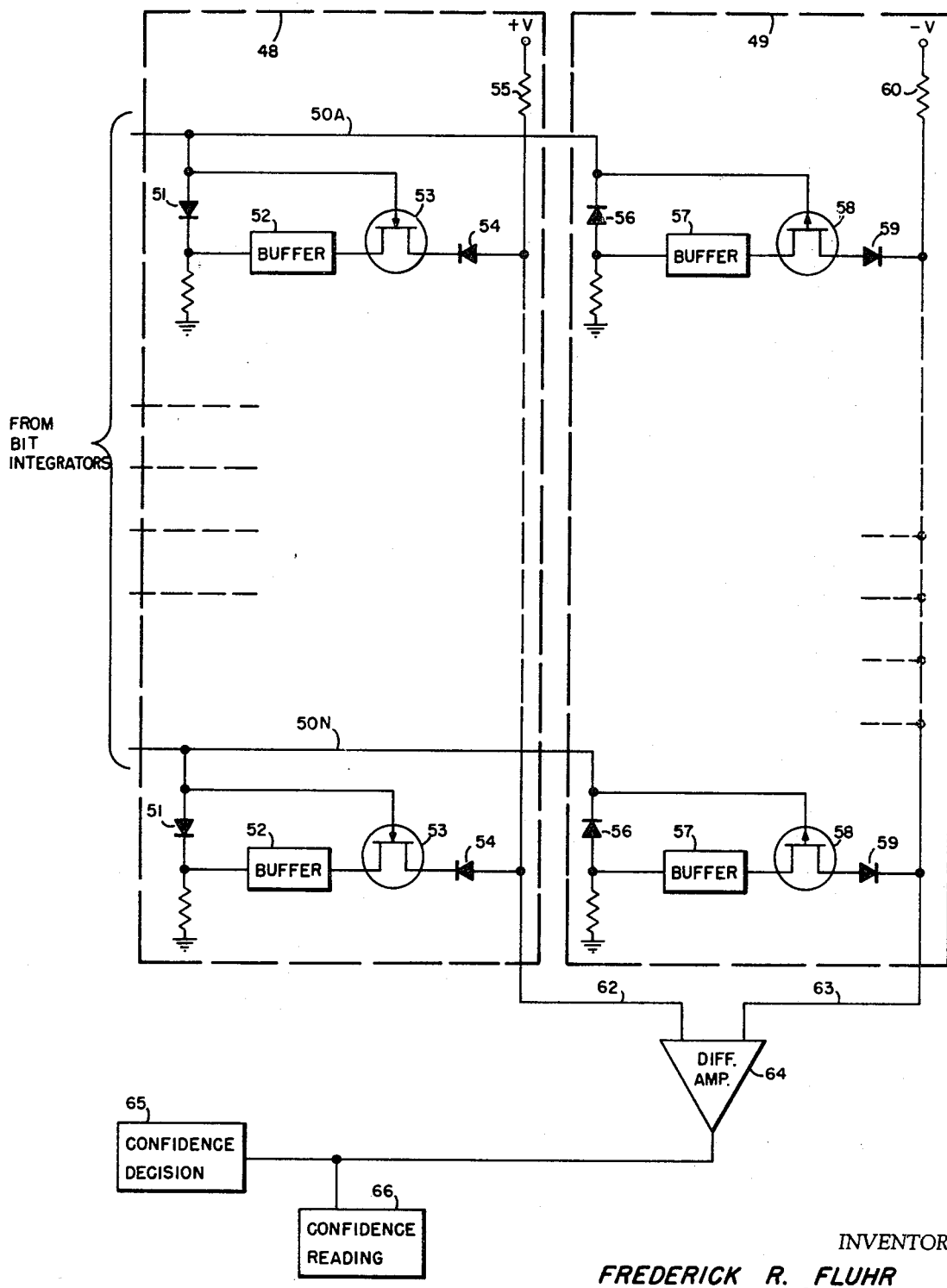
FIG. 3 is a simplified diagram of the confidence indication circuits of the invention.

FIG. 3 is a simplified diagram of the confidence indication circuits represented by 11 of FIG. 1. The weighted outputs from each bit position integrator 38 are fed on lines 50A . . . N into two selector circuits 48 and 49, shown enclosed by the broken lines. Circuit 48 gates through the smallest or least positive magnitude voltage present on any of the integrator output lines while circuit 49 gates through the least negative magnitude voltage. Progressively smaller magnitude outputs from the bit integrators would indicate a decreasing confidence or a lesser probability of a correct bit readout. The smallest positive magnitude output from any of the integrators would therefore be an indication of the least reliable "1" condition while the smallest negative magnitude is an indication of the poorest confidence associated with any "0" condition. It is therefore seen that the difference between these smallest outputs would give an indication of the confidence of the overall code readout, based upon the least reliable of each of the binary digits. The output of the difference amplifier is fed to confidence decision circuitry 65 which will automatically decide whether to read out the code or not based on a preselected minimum confidence level. Alternatively, a meter readout 66 could be provided which indicates the exact value of the output of the differential amplifier and the operator could accept or reject the code on this basis.

Looking more closely at FIG. 3, it is seen that each of the bit integrators 38 is coupled into both selector circuits 48 and 49. Each selector circuit is made up of a plurality of identical subcircuits. The same numerical designation will be used when referring to similar components in each of these subcircuits. A positive voltage input into any of the subcircuits which comprises the least negative magnitude selector will keep diodes 56 turned off. A negative voltage will likewise keep diodes 51 of the circuits 48 turned off. Thus the subcircuits of the least negative magnitude voltage selector can only be activated by a negative voltage whereas the subcircuits of the least positive magnitude voltage selector only be activated by a positive voltage. If only one positive voltage is fed into the selector circuit 48 it will appear on line 62. This takes place since a positive voltage will close diode 51 and enable gate 53. Since the +V voltage will be selected to be greater than any possible positive input from the integrators, diode 54 will conduct current to ground through the low impedance buffer 52. If more than one positive voltage is fed into the selector circuit 48 the least positive will appear on line 62 since current will be drawn through the subcircuit having the lowest positive voltage. A similar operation takes place in circuits 49 whereby the least negative of its inputs appears on line 63. The voltages on lines 62 and 63 are fed into a differential amplifier as explained previously.

What is claimed and desired to be secured by Letters Patent of the United States is:

1. In an IFF system, means for evaluating the confidence of a binary code readout comprising;
    means for storing received binary codes,
    means coupled to said storage means for transferring successive code returns received from a preselected target to an evaluation circuit,
    a plurality of evaluation circuit means each coupled to said transfer means and said storage means for evaluating the most probable binary value of each bit position of said code over a time period wherein a preselected number of code returns are received from said target, and
    means coupled to said evaluating means for indicating said most probable value of each bit position.

2. The system recited in claim 1 wherein each evaluation circuit means comprises:
    two reference D.C. voltage sources,
    integrating means, and
    selector gate means coupled to said storage means and to said sources for switchably coupling a first of said sources to said integrating means upon the occurrence of one of said binary digits at a bit position and for switchably coupling a second source to said integrating means upon the occurrence of the other of said binary digits at said bit position.

3. The system of claim 2 further including;
    means for activating said indicating means in response to a preselected output from integrating means.

4. The system as in claim 2 wherein one of said reference sources is positive with respect to ground and the other is negative with respect to ground and further including,
    first and second selector means coupled to said integrating means for generating outputs equal to the smallest positive magnitude and smallest negative magnitude of the outputs from said integrating means,
    means for generating a signal equal to the difference between said smallest outputs, said signal being an indication of the overall confidence of the code being read out.

5. The system recited in claim 1 wherein said means for transferring includes;
- means for converting light flashes on a plan position indicator corresponding to said target into an electrical pulse,
- means coupled to said storage means for generating a second pulse indicating the presence of a code in said storage means, and
- a transfer gate coupled to said evaluation means, to said means for converting and to said second pulse generating means for gating said second pulse into said evaluation means during the simultaneous presence of said first pulse thereby permitting the transfer of said code.

References Cited

UNITED STATES PATENTS

| | | |
|---|---|---|
| 3,341,845 | 9/1967 | Deman. |
| 3,432,851 | 3/1969 | Cox et al. _____ 343—6.5 |
| 3,440,651 | 4/1969 | Fluhr et al. |

RODNEY D. BENNETT, Jr., Primary Examiner

M. F. HUBLER, Assistant Examiner